Patented May 24, 1938

2,118,275

UNITED STATES PATENT OFFICE 2,118,275

PROCESS FOR PREPARING NITRO-
CELLULOSE

Ralph H. Talbot, Rochester, N. Y., assignor to
Eastman Kodak Company, Rochester, N. Y., a
corporation of New Jersey No Drawing. Application February 4, 1937,
Serial No. 124,086

7 Claims. (Cl. 260—145)

This invention relates to the preparation of methyl alcohol-soluble nitrocellulose by nitrating cellulose having a low cuprammonium viscosity and a low soda soluble content with a nitrating bath having a composition within a certain limited range and under particular conditions as will be more fully pointed out herein.

Heretofore nitrocellulose having the desired solubility characteristics in methyl alcohol has been made by nitrating cotton linters having a high cuprammonium viscosity at a relatively high temperature for a considerable length of time with a weak nitrating mixture. By the use of a weakened mixture more of the nitrocellulose is dissolved and thereby lost.

One object of my invention is to provide a process for preparing a nitrocellulose having the desired solubility characteristics in methyl alcohol, in which a lower temperature and a shorter time may be employed than has been necessary previously. Another object of my invention is to provide a process in which the strength of the nitrating mixture need not be lessened and loss of nitrocellulose is thereby avoided. A further object of my invention is to prepare a nitrocellulose having a good appearance in methyl alcohol due to substantially 100% solubility therein, without waste in the process of making the same. Substantially 100% solubility in methyl alcohol means that at film coating concentrations such as 3½:1 to 5:1 of methyl alcohol to ester a solution or dispersion is obtained of excellent clarity, which is free from haze, jelly lumps or other particles.

I have found that the above objects may be attained if nitrocellulose is prepared by nitrating cellulose having a cuprammonium viscosity of not more than 12 seconds and a proportion of soda soluble constituents of not more than 7% to a nitrogen content of 11.7% to 12.05% with a nitrating bath of the following composition for 20–46 minutes at 112–130° F.:

|  | Percent |
|---|---|
| Nitric acid | 14 to 35 |
| Sulfuric acid | 66 to 47 |
| Total of nitric and sulfuric acids | 79 to 83 | the range of the sum of the equivalent percentages of the nitrating acids in the nitrating mixture being 1.57 to 1.52.

The cuprammonium viscosity of the cellulose, which is employed as the starting material, is 4½–12 seconds and preferably 6–9 seconds (based on 2½% concentration). Below this viscosity, the cost of preparing the nitrocellulose might be greater due to the fact that the fibre of the low viscosity cellulose is more broken up which might cause loss in washing. If a cellulose having a higher viscosity was employed, a longer time, or a higher temperature, or both would be necessary for its nitration and the yield of the nitrocellulose would not be as good as that from the nitration of a cellulose having a viscosity of not more than 12 seconds. The product which is formed has an extremely high solubility in methyl alcohol making for clarity of the solutions. It is also characterized by a solubility in ethyl alcohol of about 7–9%. I have found, however, that esters in which the ethyl alcohol solubility is in the neighborhood of 8% give the best solutions. The nearness of ethyl alcohol solubility to 8% is generally an indication of the suitability of the nitrocellulose for solution in methyl alcohol, for the coating of sheeting of high tensile strength, tear resistance and flexibility. When the ethyl alcohol solubility is much below this, such as less than 7%, the nitrocellulose solutions are more sensitive to traces of water as are usually found in commercially pure solvents while if the ethyl alcohol solubility is much greater, difficulties are encountered in the film-forming process leading to haze and opacity in the resulting sheeting. From a practical standpoint it is preferred that the nitrating bath have the following composition:

|  | Percent |
|---|---|
| Nitric acid | 15–22 |
| Sulfuric acid | 66–61 |
| Total of nitric and sulfuric acids | 79–83 | the range of the sum of the equivalent percentages of the nitrating acids in the nitrating mixture being 1.57 to 1.52.

My objection to a nitrating mixture having a nitric acid content of less than a couple of percent below 15% is that the bath is impoverished of nitric acid during nitration and the nitration may not go to completion. Also with lower nitric acid content a higher sulfuric acid and water content is necessary. The cellulose nitrate having a higher solubility therein, results in a poorer yield.

With a nitrating bath having a nitric acid content of more than 22% ordinarily the loss due to retention of the nitric acid by the cellulose is higher than with baths having a nitric acid content not above 22%. On the other hand with certain types of wood pulp it is an advantage to raise the nitric acid content above 22% to facilitate its nitration. For the cellulose which I employ I have found that the range of 15% to 22% nitric acid for the nitrating bath is preferable.

Often the nitrating baths especially if the spent nitrating mixtures are fortified for reuse will contain some oxides of nitrogen. This nitrogen oxide content is not to be regarded as part of the acid content of the nitrating bath but as the equivalent of the water for the making up of the nitrating bath.

The following examples illustrate the preparation of nitrocellulose in accordance with my invention.

Example I

One part by weight of refined cotton linters having a cuprammonium viscosity of 7 seconds and a solubility in 7.14% caustic soda of 2.7% was added to 50 parts of a nitrating bath having the following composition: 16% nitric acid, 63.5% of sulfuric acid and the remainder made up principally of water. The mass was agitated for about ½ hour at a temperature of approximately 118° F. at the end of which time the nitration was substantially complete. The nitrated cotton was centrifuged to remove the acid and was then thoroughly washed with hot water. A nitrocellulose was obtained having a nitrogen content of 11.9%, a solubility of 8% in ethyl alcohol and a viscosity of 7.8 seconds. The nitrocellulose was completely soluble in anhydrous methyl alcohol forming a brilliant solution free from haze and grain.

Example II

One part by weight of cotton linters having a cuprammonium viscosity of 7 seconds and a solubility in 7.14% caustic soda of 2.7% was added to a nitrating bath containing 50 parts by weight of a mixed acid having the following composition: 20.4% nitric acid, 4% of oxides of nitrogen calculated as $N_2O_4$, 58.8% of sulfuric acid, and 16.8% water. The nitration was carried out with gentle agitation for about ½ hour at a temperature of 124° F. after which the acid was centrifuged off from the nitrated cotton, which was thoroughly washed with hot water. A nitrocellulose having the following characteristics was obtained: 11.95% nitrogen content, 7% solubility in ethyl alcohol and 10 seconds viscosity. The nitrocellulose was completely soluble in anhydrous methyl alcohol forming a brilliant solution free from haze or grain.

The following tabulations give further examples of nitrating mixtures which are suitable to be employed within the terms of my invention:

|  | Example III | Example IV |
|---|---|---|
|  | Percent | Percent |
| Nitric acid | 20.0 | 34.8 |
| Sulphuric acid | 60.2 | 47.6 |
| Total of nitric and sulphuric acids | 80.2 | 82.4 |
| Nitrogen oxides calculated as $N_2O_4$ | 3.2 | 2.6 |
| Water | 16.6 | 15.0 |
| Total | 100.0 | 100.0 |

In each case a nitrocellulose is obtained having a low viscosity, a solubility in ethyl alcohol close to 8%, which indicates a solubility in methyl alcohol of approximately 100%. It is pointed out that the nitrating acid should be such as is found in a restricted range, namely 14–35% of nitric acid, 65–48% of sulfuric acid, and 79–83% of the mixture of nitric and sulfuric acids based on the total bath employed, and a very narrow range of the sum of the equivalent percentages of the nitrating acids in the nitrating mixture of 1.57 to 1.52.

This range, with reference to the examples, may be determined by dividing the percentage of each acid by its equivalent weight and adding as follows:

|  | I | II | III |
|---|---|---|---|
| Equivalent percentage of $HNO_3$ | $\frac{16}{63} = .254$ | $\frac{20.4}{63} = 0.324$ | $\frac{20}{63} = 0.317$ |
| Equivalent percentage of $H_2SO_4$ | $\frac{63.5}{49} = 1.296$ | $\frac{58.8}{49} = 1.2$ | $\frac{60.2}{49} = 1.228$ |
| Sum of equivalent percentages | 1.550 | 1.524 | 1.545 |

The yield of nitrocellulose by my process is high and the sheeting which is formed by coating with a solution of the ester from methyl alcohol containing a small amount of acetone may be comparatively rapidly stripped from the coating surface so that the coating apparatus may be run at a high rate of speed. The following is a comparison between the products obtained from a nitration in accordance with my invention compared with the product which is obtained ordinarily:

| Nitrating Conditions | | | Properties of nitrocellulose | | | |
|---|---|---|---|---|---|---|
| Cuprammonium viscosity in 2½% concentration | Time of nitration | Temperature of nitration | Nitrogen | Ethyl alcohol solubility test | Viscosity in acetone and methyl alcohol | Yield |
| Seconds | Minutes | °F. | Percent | | | Percent |
| 3.7 | 27 | 118½ | 11.87 | 7.5 | 5 | 157.6 |
| 5.4 | 27 | 117½ | 11.93 | 8.8 | 8.4 | 150 |
| 4.5 | 27 | 116 | 12.00 | 7.8 | 12.4 | 159 |
| 4.5 | 27 | 116 | 11.93 | 8.8 | 9.7 | 155 |
| 22½ | 27 | 123 | 11.99 | 6.2 | 14.8 | 149.7 |
| 22½ | 27 | 121 | 11.94 | 5.6 | 16.4 | 149.1 |
| 671 | 45 | 123½ | 11.62 | 11 | 8.8 | 137 |
| 671 | 45 | 125 | 11.76 | 8.9 | 8.9 | 143 |

It may be seen from the above tabulation that it is necessary that the nitrating conditions be more severe with the cellulose which has a higher viscosity. Also, it may be seen that the yields obtained are much greater using cellulose having a low viscosity. The cellulose, which is to be employed as the starting material, is restricted to that which has a solubility of not more than 7% in 7.14% caustic soda or in 10% caustic potash solution. As the cellulose esters, which are prepared by my process, have a nitrogen content of 11.7 to 12.05%, it may be seen that they are restricted to a narrow range of nitrogen content. It is by nitrating only to this nitrogen content and with the particular nitrating conditions specified, that I am able to obtain the high yields and excellent product which is prepared by the present invention.

The viscosity of the cellulose nitrate is obtained by taking a sample which has been dried for 1½ hours at 105–106° F. dissolving ten grams of the ester in a mixture of 50 cc. each of methyl alcohol and acetone and then determining the time of fall of a ⅛ inch steel ball through 15 cm. of the dope at 25° C. The sheeting formed from the nitrocellulose which is prepared by my invention may be employed for various purposes particularly as the base for photographic film. The sheeting prepared therefrom has good clarity and flexibility. Various forms of cellulose, providing they have been properly refined and have the viscosity and soda-soluble characteristics referred to, may be employed as the starting material. Although the examples mention the use of cotton linters, wood pulp, especially of the sulphite type, which has been properly refined by separating the resins and other impurities from the alpha cellulose, may be employed as the starting material in my process.

I claim as my invention:

1. A process of preparing nitrocellulose which comprises nitrating cellulose having a cuprammonium viscosity of not more than 12 seconds and not more than 7% of alkali-soluble constituents, with a nitrating bath containing 15–35% of nitric acid, 66–47% of sulfuric acid and a total content of combined nitric and sulfuric acid of 79–83%, the sum of the equivalent percentages of these acids being 1.57–1.52.

2. A process of preparing nitrocellulose which comprises nitrating cellulose having a cuprammonium viscosity of 4½–12 seconds and not more than 7% of alkali-soluble constituents with a nitrating bath containing 14–35% of nitric acid, 66–47% of sulfuric acid and a total content of combined nitric and sulfuric acid of 79–83%, the sum of the equivalent percentages of these acids being 1.57–1.52.

3. A process of preparing nitrocellulose which comprising nitrating cellulose having a cuprammonium viscosity of 6–9 seconds and not more than 7% of alkali-soluble constituents with a nitrating bath containing 15–22% of nitric acid, 66–61% of sulfuric acid, and a total content of combined nitric and sulfuric acids of 79–83%, the sum of the equivalent percentages of these acids being 1.57–1.52.

4. A process of preparing nitrocellulose which comprises nitrating cellulose having a cuprammonium viscosity of approximately 7 seconds and a solubility in 7.14% aqueous sodium hydroxide of not more than 7% with a nitrating bath containing approximately 16% of nitric acid, 63% of sulfuric acid and the remainder principally water.

5. A process of preparing nitrocellulose which comprises treating cellulose having a cuprammonium viscosity of not more than 12 seconds and not more than 7% of alkali-soluble constituents for 20–46 minutes at 112–130° F. with a nitrating bath containing 15–35% of nitric acid, 66–47% of sulfuric acid and a total content of combined nitric and sulfuric acids of 79–83%, the sum of the equivalent percentages of these acids being 1.57–1.52.

6. A process of preparing nitrocellulose which comprises nitrating refined cotton linters having a cuprammonium viscosity of not more than 12 seconds and not more than 7% of alkali-soluble constituents, with a nitrating bath containing 15–35% of nitric acid, 66–47% of sulfuric acid and a total content of combined nitric and sulfuric acid of 79–83%, the sum of the equivalent percentages of these acids being 1.57–1.52.

7. A process of preparing nitrocellulose which comprises treating cellulose having a cuprammonium viscosity of approximately 7 seconds and a solubility in 7.14% aqueous sodium hydroxide of not more than 7% for approximately one-half hour at a temperature of about 118° F. with a nitrating bath containing approximately 16% of nitric acid, 63% of sulfuric acid and the remainder principally water.

RALPH H. TALBOT.